UNITED STATES PATENT OFFICE.

HENRY W. BARTOL, OF PHILADELPHIA, PENNSYLVANIA.

MANUFACTURE OF GLUCOSE OR GRAPE-SUGAR.

SPECIFICATION forming part of Letters Patent No. 264,222, dated September 12, 1882.

Application filed April 12, 1882. (No specimens.)

*To all whom it may concern:*

Be it known that I, HENRY W. BARTOL, a citizen of the United States, residing at Philadelphia, in the county of Philadelphia and State of Pennsylvania, have invented a new and useful Improvement in the Manufacture of Glucose or Grape-Sugar, as set forth in the following specification.

The use of acids and alkalies for the separation of gluten and oil from vegetable products—notably Indian corn or maize—has long been known. Hence the object of this application is not to claim the exclusive use of either acids or alkalies for that purpose, but the manner of their use applied to grain or other starch-bearing vegetables preparatory to converting them into glucose or grape-sugar, as hereinafter described.

Acids or alkalies, when used heretofore, have been applied either to the grain direct, (as early as 1842,) preparatory to the starch being separated from the grain, or to the starch after it has been separated from the grain and previous to its (the starch's) conversion into glucose or grape-sugar; but nobody has heretofore treated the grain or other starch-bearing vegetable with warm acids or alkalies to remove the gluten and oils, which I claim is an improvement; nor have they converted into glucose or grape-sugar grain or other starch-bearing vegetables (mixed with a sufficient amount of water and acid) which had been previously treated with acids or alkalies to remove the gluten and oils, which is where my invention differs materially from Johnson's Patent No. 186,935, he not using warm acids or alkalies, and he saturating his grain with the requisite acid for conversion, and then draining it, whereas I only add the acid for conversion just before introducing the mass into the converter, and introduce with it a certain quantity of water.

Having described the present condition of the art, I will now proceed to describe my invention.

I subject the grain or other starch-bearing vegetable—whole, ground, or cracked, but preferably ground—first to a treatment with a weak solution of acid or alkali by soaking it in a solution, preferably warm, (containing not less than one-tenth per cent. and not over one per cent. of acid or alkali, and not over 120° Fahrenheit,) until the gluten and oil are dissolved and held in solution, when as much as can be drawn off without losing any starch is drawn off and laid aside. I then introduce water not over 120° Fahrenheit, which I keep on adding until the wash runs off neutral to litmus-paper.

I am aware of Patent No. 58,824, granted to S. H. Hirsh, October 16, 1866, for the manufacture of starch, in which a process similar to mine is employed for the elimination of the gluten, and to this part of my process I make no claim, except in connection with the subsequent treatment of the resultant mass for the manufacture of glucose or grape-sugar, as herein described.

Having washed the grain or other starch-bearing vegetable, it is allowed to settle and the water drawn off, until not more than twenty-four gallons nor less than twelve gallons remain for every one hundred pounds of grain, which is now ready to be converted into glucose or grape-sugar by any of the known processes, it only being necessary to add the acid and introduce it into the converter.

Having thus fully described my invention and the manner in which the same is or may be carried into effect, what I claim, and desire to secure by Letters Patent, is—

1. The hereinbefore-described process of treating grain or other starch-bearing vegetables, which consists in soaking in weak acid or alkali solutions, as specified, washing out the acid or alkali until the mass is neutral to litmus-paper, drawing off so much of the water that not more than twenty-four nor less than twelve gallons remain for each one hundred pounds of the grain or other starch-bearing vegetable used, and then adding sufficient acid for conversion into glucose or grape-sugar and converting at once by any of the known processes.

2. The use of acid or alkali solutions of from 90° to 120° Fahrenheit to remove the gluten and oils from grain or other starch-bearing vegetables in the manufacture of glucose or grape-sugar, as hereinbefore described, whereby the quantity of acid or alkali and likewise the time are materially reduced.

HENRY W. BARTOL.

Witnesses:
GEORGE H. ROGERS,
WILLIAM BORLAND.